(12) United States Patent
Rockwell et al.

(10) Patent No.: US 7,299,903 B2
(45) Date of Patent: Nov. 27, 2007

(54) SYMMETRIC BRAKE CLIP

(75) Inventors: Todd Rockwell, South Lyon, MI (US); James Bergman, New Boston, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 11/338,947

(22) Filed: Jan. 25, 2006

(65) Prior Publication Data

US 2007/0170019 A1 Jul. 26, 2007

(51) Int. Cl.
*F16D 65/38* (2006.01)
(52) U.S. Cl. .................................. 188/73.36
(58) Field of Classification Search ... 188/73.36–73.38
See application file for complete search history.

(56) References Cited

U.S. PATENT DOCUMENTS

| | | | |
|---|---|---|---|
| 4,371,060 A | 2/1983 | Iwata | |
| 5,193,652 A | 3/1993 | Thiel et al. | |
| 5,377,790 A | 1/1995 | Tsuruta | |
| 5,381,875 A | 1/1995 | Tsuruta et al. | |
| 5,649,610 A | 7/1997 | Shimazaki et al. | |
| 5,699,882 A * | 12/1997 | Ikegami et al. | 188/73.38 |
| 5,934,417 A | 8/1999 | Kobayashi et al. | |
| 6,003,642 A | 12/1999 | Mori et al. | |
| 6,186,288 B1 * | 2/2001 | Baba et al. | 188/73.36 |
| 6,223,866 B1 * | 5/2001 | Giacomazza | 188/73.38 |
| 6,269,915 B1 * | 8/2001 | Aoyagi | 188/73.38 |
| 6,296,085 B1 * | 10/2001 | Yukoku | 188/73.36 |
| 6,427,810 B2 * | 8/2002 | Schorn et al. | 188/73.39 |
| 6,478,122 B1 * | 11/2002 | Demoise, et al. | 188/73.38 |
| 2005/0194222 A1 | 9/2005 | Stickney et al. | |
| 2005/0236236 A1 | 10/2005 | Farooq | |

FOREIGN PATENT DOCUMENTS

| | | |
|---|---|---|
| EP | 0732521 | 9/1996 |
| WO | WO 2005/064193 | 7/2005 |

\* cited by examiner

*Primary Examiner*—Chris Schwartz
(74) *Attorney, Agent, or Firm*—MacMillan, Sobanski & Todd, LLC

(57) ABSTRACT

A brake pad clip for a disc brake assembly is disposed between a caliper member and a brake pad. A U-shaped section includes a base portion with opposing symmetrical leg portions extending at substantially right angles from the base portion. The U-shaped section is adapted to receive a portion of a brake pad therebetween. A first abutment portion extends from the base portion in an opposing direction from the leg portions. A second abutment portion is in spaced relation to the first abutment portion and extends from the base portion in an opposing direction of the leg portions. The first abutment portion and the second abutment portion are adapted to receive a portion of a caliper member.

10 Claims, 4 Drawing Sheets

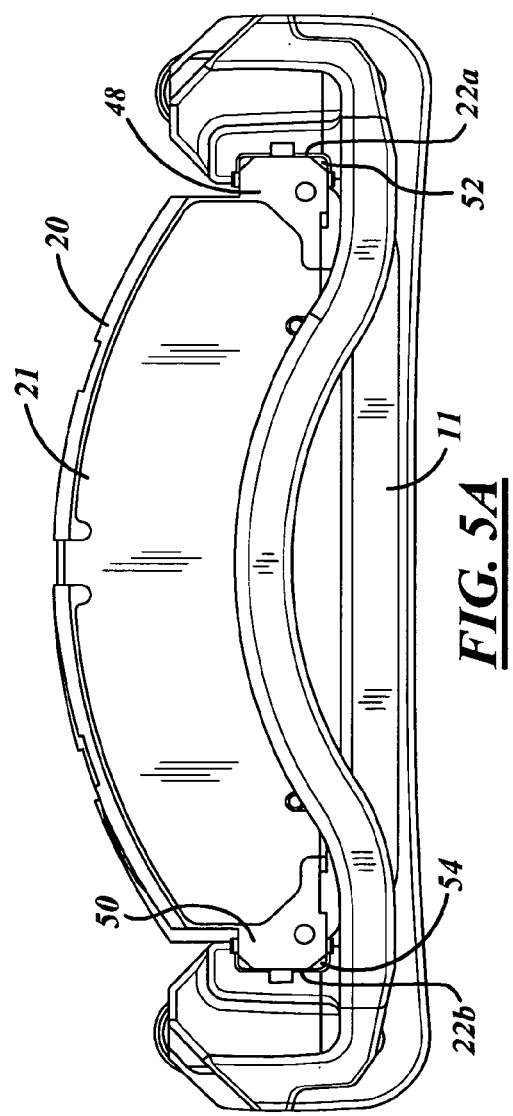
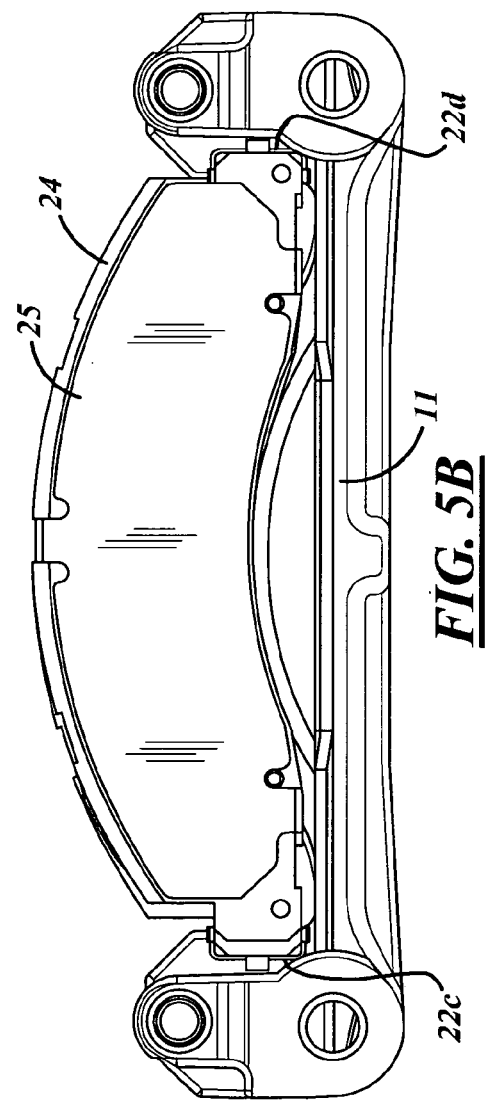
FIG. 5A
FIG. 5B

SYMMETRIC BRAKE CLIP

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to a vehicle brake disc assembly and in particular to a brake pad clip of a vehicle brake disc assembly.

2. Description of the Related Art

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a rotor which is secured to the wheel of the vehicle for rotation therewith. A caliper assembly includes a pair of brake shoes disposed on opposite sides of the rotor, which are coupled to a stationary member such as an anchor plate. The brake pads are operatively connected to one or more hydraulically actuated pistons for movement between a non-braking position and a braking position in which the brake pads come into frictional engagement with the opposed braking surfaces of the rotor.

The brake pad includes a pair of ear portions that project outwardly from a main portion of the brake pad. Each of the ear portions are disposed within respective grooves formed in respected sections of the stationary member. Brake pad clips are secured to the caliper assembly and are disposed within the groove portions for preventing wear to the respective grooves as the ear portions move within the brake pad clip due to the torque applied to the brake pad. In past applications, at least two different brake pad clips must be used within a brake disc caliper assembly to avoid an interference condition between the rotor and a respective clip. Having different clips requires separate stamping tools be created for each respective design, which adds cost. In addition, distinct part numbers must be created to identify the different brake pad clips within the manufacturing facility in addition to storing and maintaining separate part bins during assembly of the clip to the anchor plate or brake pad.

BRIEF SUMMARY OF THE INVENTION

The present invention has the advantage of utilizing a symmetrical brake pad clip which can be used at all contacting locations between the brake pad and a stationary member of the caliper assembly. The symmetrical brake pad clip only requires re-orientation to be used at each respective contact location of the caliper assembly.

In one aspect of the present invention, a brake pad clip for a disc brake assembly is disposed between a caliper member and a brake pad. A U-shaped section includes a base portion with opposing symmetrical leg portions extending at substantially right angles from the base portion. The U-shaped section is adapted to receive a portion of a brake pad therebetween. A first abutment portion extends from the base portion in an opposing direction from the leg portions. A second abutment portion is in spaced relation to the first abutment portion and extends from the base portion in an opposing direction of the leg portions. The first abutment portion and the second abutment portion are adapted to receive a portion of a caliper member.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5A is a side view of an outer brake pad-anchor plate assembly of the present invention.

FIG. 5B is a side view of an inner brake pad-anchor plate assembly of the present invention.

DETAILED DESCRIPTION OF THE PREFERRED EMBODIMENT

Figure 1:
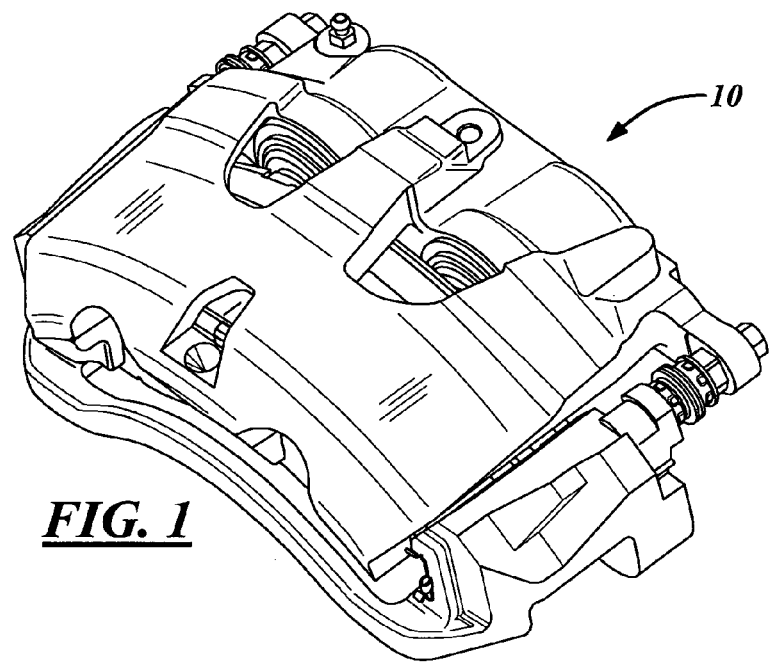
FIG. 1 is a perspective view of a disc brake assembly of the present invention.

Referring now to the drawings, there is illustrated in FIG. 1 a disc brake assembly, shown generally at 10, for applying braking friction to a braking rotor (not shown) of a vehicle (not shown).

Figure 2:
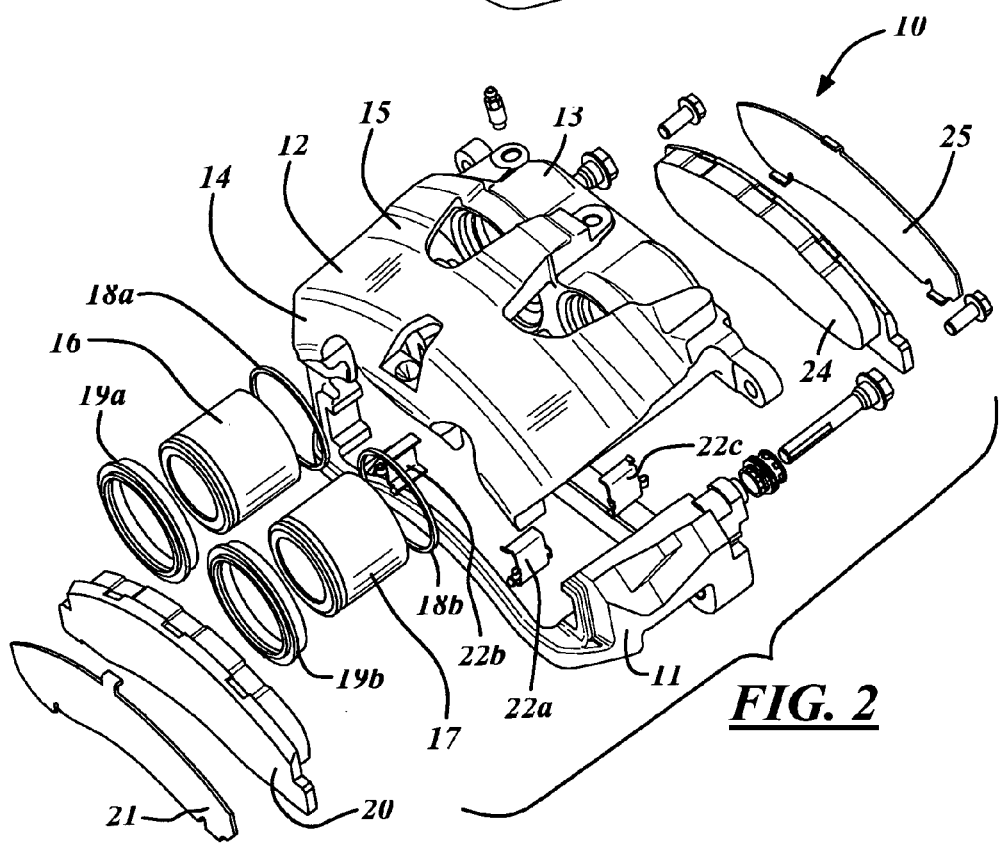
FIG. 2 is an exploded view of the disc brake assembly of FIG. 1.

FIG. 2 illustrates an exploded view of the disc brake assembly 10. The disc brake assembly 10 includes a caliper assembly which typically includes a stationary member (i.e., anchor plate) 11 and a caliper 12. The caliper 12 includes an inner section 13 and an outer section 14 connected by a bridge section 15. A pair of hydraulic actuators, namely a first piston 16 and a second piston 17 connect to hydraulic ports (not shown) of the inner section 13.

A first seal 18a and a second seal 18b are disposed between the first piston 16 and the second piston 17 and their respective hydraulic ports for creating a sealed surface between the hydraulic ports and first and second pistons 16 and 17. A first dust seal 19a and a second dust seal 19b are coupled to exposed ends of the first piston 16 and the second piston 17, respectively. The first dust seal 19a and the second dust seal 19b prevent dust and other contaminants from forming on the end portions of the first and second pistons 16 and 17.

An outer brake pad 20 and an outer noise insulator 21 are supported by the anchor plate 11. A first clip 22a and a second clip 22b are adapted to mate with end portions of the outer brake pad 20. The first clip 22a and second clip 22b assist in retaining the outer brake pad 20 to the anchor plate 11 in addition to preventing rattle of the outer brake pad 20.

An inner brake pad 24 and an inner noise insulator 25 are also supported by the anchor plate 11. A third clip 22c and a fourth clip 22d (shown in FIG. 6) are adapted to mate with end portions of the inner brake pad 24. The third clip 22c and fourth clip 22d assist in retaining the inner brake pad 24 to the anchor plate 11 in addition to preventing rattle of the inner brake pad 24.

When pressurized hydraulic fluid is forced against the first piston 16 and second piston 17, the inner brake pad 24 is urged against the brake rotor (not shown) for applying a braking friction force to the rotor. An inward force is also applied by the caliper 12 to the outer brake pad 20 for urging the outer brake pad 20 against the brake rotor for applying a braking friction force to the rotor.

Figure 4:
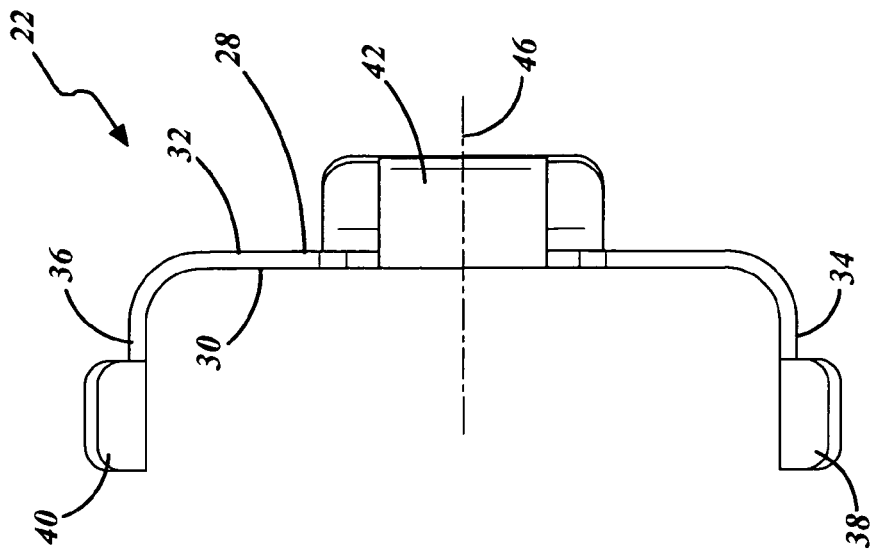
FIG. 4 is a side view of a brake pad clip of the present invention.
Figure 3:
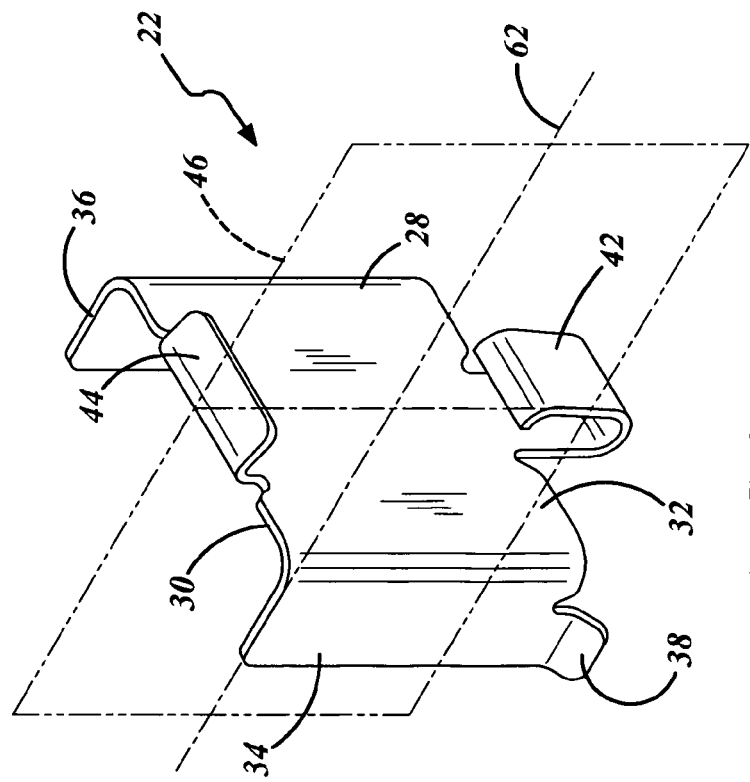
FIG. 3 is a perspective view of a brake pad clip of the present invention.

Referring to both FIG. 3 and FIG. 4, a brake pad clip 22, that is the same design as brake pad clips 22a, b, c, d, includes a substantially flat base portion 28. The base portion 28 includes a first side surface 30 and a second side surface 32. A first leg portion 34 and a second leg portion 36 extend outward from the first side surface 30 of the base portion 28 thereby forming a U-shaped channel for receiving a respective portion of the brake pad (not shown in FIGS. 3 and 4). Preferably, the first leg portion 34 extends from the first side surface 30 at an angle less than 90 degrees and the second leg portion 36 extends from the first side surface 30 at an angle less than 90 degrees. Extending both leg portions 34 and 36 at an angle less than 90 degrees from the first side surface 30 provide anti-rattle properties for the respective pad when retained on the anchor plate. Alternatively, the first leg portion 34 and the second leg portion 36 may each extend at substantially right angles from the first side surface 30. In both embodiments, the first leg portion 34 and the second leg portion 36 are symmetrical to one another.

The first leg portion 34 includes a first angled member 38 which protrudes outward from an end of the first leg portion 34 at a predetermined angle. The second leg portion 36 includes a second angled member 40 which protrudes outward from an end of the second leg portion 36 at the same predetermined angle as the first angled member 38. The first angled member 38 and second angled member 40 are symmetrical to one another. The first angled member 38 and the second angled member 40 provide a lead in passageway for ease of installation of the respective brake pads.

The brake pad clip 22 further includes a first abutment member 42 extending away from the second side surface 32. The brake pad clip 22 also includes a second abutment member 44 that is in spaced relation to the first abutment member 42 and extends away from the second side surface 32 of the base portion 28. The first abutment portion 42 extends more laterally outward from the base portion 28 than does the second abutment portion 44.

Both the first and second abutment members 42 and 44 are resilient for receiving and accommodating the anchor plate. The first abutment member 42 and the second abutment member 44 cooperatively provide a retention load to a portion of the anchor plate (not shown in FIGS. 3 and 4) therebetween for securing the brake pad clip 22 to the anchor plate.

As shown in FIGS. 3 and 4, a central plane 46 extends through the base portion 28 spaced equally and substantially parallel to the first leg portion 34 and second leg portion 36.

The central plane 46 is a plane of symmetry such that the brake pad clip 22 is symmetrical about the central plane 46. Since the brake pad clip 22 is symmetrical, the brake pad clip 22 may be used at all four contact locations between the respective pair of brake pads and the anchor plate (not shown) as illustrated by 22a, b, c, d (shown in FIG. 6).

FIGS. 5A and 5B illustrate the outer brake pad 20 and the inner brake pad 24 mounted to the anchor plate 11, respectively. Referring to FIG. 5A, a first ear portion 48 and a second ear portion 50 are seated within a first groove portion 52 and a second groove portion 54 of the anchor plate 11. The first clip 22a is seated within the first groove portion 52. The first ear portion 48 of the outer brake pad 20 is retained and located in the first groove portion 52 by the first clip 22a.

The second clip 22b is seated within the second groove portion 54 of the anchor plate 11. The second ear portion 50 is retained and located in the second groove portion 54 by the second clip 22b. The first clip 22a and the second clip 22b are identical, with varied orientation within their respective groove portions 52 and 54.

Figure 6A:
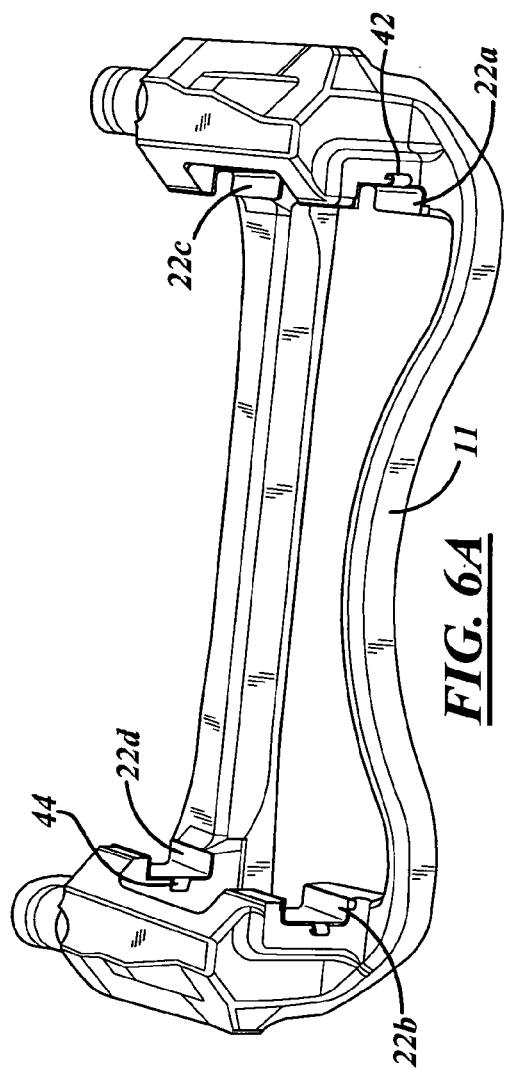
FIG. 6A is a perspective view of an outer anchor plate-clip assembly of the present invention.
Figure 6B:
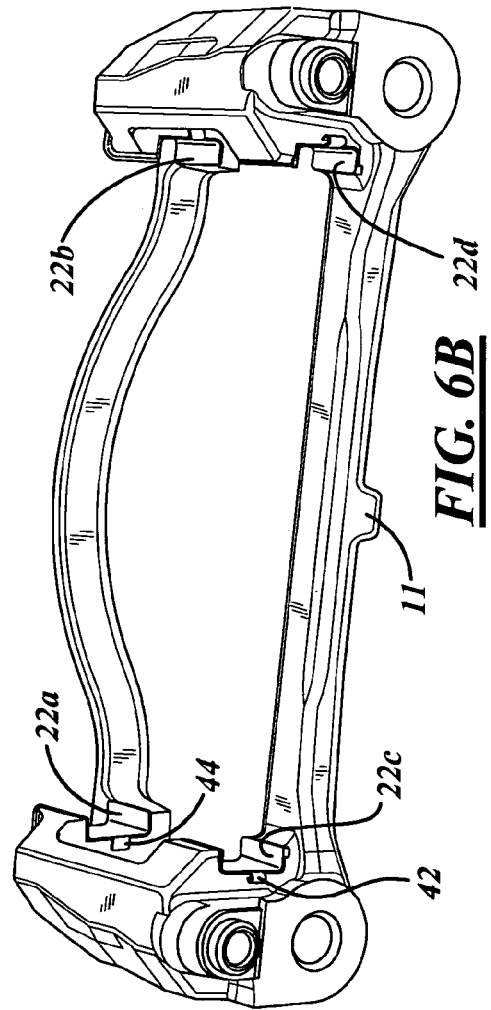
FIG. 6B is a perspective view of an inner anchor plate-clip of the present invention.

FIGS. 6A and 6B illustrate the anchor plate 11 utilizing the plurality of brake pad clips 22a, b, c, d at each of the respective contacting locations. The anchor plate 11 (less the brake pads) is typically positioned over a portion of the rotor (not shown). A tight tolerance gap exists between a respective brake pad (not shown) and rotor (not shown). The plurality of brake pad clips 22a, b, c, d are shown seated within respective groove portions in the anchor plate 11. Each respective brake pad clip is oriented such that the respective first abutment member 42 is disposed on the outer side of the anchor plate 11 and each respective second abutment member 44 is disposed on the inner side of the anchor plate 11. Each of the respective brake pad clips 22a, b, c, d are interchangeable with one another such that each clip may be used at any of the four contacting locations by just re-orientating the respective clip as it is assembled into a respective groove portion. For example, brake pad clips 22a and 22b are positioned opposite of one another for receiving opposing ends of the outer brake pad 20. Brake pad clips 22a and 22b are oriented 180 degrees about the central axis (shown in FIG. 3) from one another for being assembled into their respective groove portions. Similarly, brake pad clips 22a and 22c are shown assembled to adjacent groove portions for receiving the first brake pad 20 and the second brake pad 24 (not shown), respectively. Brake pad clips 22a and 22c are of the same design but oriented 180 degrees from one another about an axis 62 which runs perpendicular through the center of the base portion 28 of each clip (as shown in FIG. 3).

The first leg portion 34 and the second leg portion 36 are symmetrical and substantially contained with a respective groove portion. As a result, brake pad clips 22a, b, c, d may be assembled to any of the respective groove portions by rotating a respective brake pad clip to a respective orientation. Since the the leg portions 34 and 36 are symmetrical, the attaching each of the plurality of, brake pad clips 22a, b, c, d any of the respective grooves of the anchor plate 11 (including the brake pad and rotor) may be accomplished so long as the first abutment member 42 is maintained on an outer side of the anchor plate 11. The first abutment member 42 of each respective clip is maintained on the outer side of the anchor plate; otherwise, an interference condition between the laterally extending first abutment member 42 and the rotor may occur due to the tight tolerance gap maintained between the brake pad and the rotor.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A brake pad clip for a disc brake assembly disposed between a stationary member and a brake pad, said brake pad clip comprising:
   a U-shaped section including a base portion with opposing symmetrical leg portions extending at substantially right angles from said base portion, said U-shaped section adapted to receive a portion of a brake pad therebetween;
   a first abutment portion extending from said base portion in an opposing direction from said leg portions; and
   a second abutment portion in spaced relation to said first abutment portion and extending from said base portion in an opposing direction of said leg portions, said first abutment portion and said second abutment portion adapted for receiving a portion of the stationary member.

2. A brake pad clip for a disc brake assembly disposed between a stationary member and a brake pad, said brake pad clip comprising:
   a substantially flat base portion having a first side surface and a second side surface, said first side surface adapted to be in contact with said brake pad and said second side surface adapted to be in contact with said stationary member;
   a first substantially flat leg extending outward from said first side surface of said base portion;
   a second substantially flat leg extending outward from said first side surface of said base portion substantially parallel to said first leg;
   said first substantially flat leg and said second substantially flat leg adapted to receive said brake pad therebetween;
   a first abutment portion extending outward from said second side surface of said base portion; and
   a second abutment portion extending outward from said second side surface of said base portion in spaced relation to said first abutment portion. said first abutment portion and said second abutment portion receiving said stationary member therebetween;
   wherein said first leg portion and said second leg portion extending from said base portion are symmetrical to one another.

3. A disc brake assembly comprising:
   a stationary member straddling a rotor member;
   a pair of brake pads coupled to said stationary member, said pair of brake pads respectively disposed on a respective side of said rotor member;
   a plurality of brake pad clips disposed at respective contact locations between said stationary member and said pair of brake pads;
   wherein each respective clip includes a base portion and leg members extending from said base portion for receiving a respective portion of said pair of brake pads for coupling said pair of brake pads to said stationary member, and wherein said leg members are symmetrical for allowing each respective clip to be used at any of said respective contact locations.

4. The disc brake assembly of claim 3 wherein said stationary member includes groove portions, and each of said plurality of brake pad clips are disposed within a respective groove portion.

5. The disc brake assembly of claim 3 wherein said leg members each include an angle member for providing a lead in passageway for receiving said respective portion of said pair of brake pads, and wherein said angle members of each respective clip are symmetrical.

6. The disc brake assembly of claim 5 wherein said leg members engage said pair of brake pads for reducing movement of said respective portion of said pair of brake pads within said plurality of brake pad clips to prevent rattle.

7. The disc brake assembly of claim 6 wherein said symmetrical leg members each extend from said base portion at less than right angles.

8. The disc brake assembly of claim 3 wherein said symmetrical leg members extend substantially at right angles to said base portion.

9. The disc brake assembly of claim 3 wherein each respective clip is symmetrical about a central plane extending normal to said base portion and being equally spaced between said leg portions.

10. The disc brake assembly of claim 3 wherein said plurality of brake pad clips each include a first abutment portion extending from said base portion in an opposing direction of from said leg portions, a second abutment portion in spaced relation to said first abutment portion and extending from said base portion in an opposing direction of said leg portions, said first abutment portion and said second abutment portion receiving a portion of said stationary member and applying a retention load on said portion of said stationary member therebetween.

* * * * *